US012757876B2

(12) United States Patent
Prieto et al.

(10) Patent No.: US 12,757,876 B2
(45) Date of Patent: Oct. 13, 2026

(54) AUTOMATIC BIRD FEEDER WITH DOUBLE TELESCOPIC SYSTEM

(71) Applicants: Francisco Javier Septien Prieto, Celaya (MX); Leticia Dussan Garcia, Celaya (MX); Sebastian Septien Dussan, Celaya (MX); Jose Ramon Septien Dussan, Celaya (MX)

(72) Inventors: Francisco Javier Septien Prieto, Celaya (MX); Leticia Dussan Garcia, Celaya (MX); Sebastian Septien Dussan, Celaya (MX); Jose Ramon Septien Dussan, Celaya (MX)

( * ) Notice: Subject to any disclaimer, the term of this patent is extended or adjusted under 35 U.S.C. 154(b) by 0 days.

(21) Appl. No.: 18/695,330

(22) PCT Filed: Jan. 2, 2023

(86) PCT No.: PCT/MX2022/050137
§ 371 (c)(1),
(2) Date: Mar. 25, 2024

(87) PCT Pub. No.: WO2024/147725
PCT Pub. Date: Jul. 11, 2024

(65) Prior Publication Data
US 2025/0127148 A1 Apr. 24, 2025

(51) Int. Cl.
*A01K 39/012* (2006.01)

(52) U.S. Cl.
CPC ................................ *A01K 39/0125* (2013.01)

(58) Field of Classification Search
CPC .................................................. A01K 39/0125
See application file for complete search history.

(56) References Cited

U.S. PATENT DOCUMENTS 4,476,811 A * 10/1984 Swartzendruber ..... A01K 39/01 119/57.4
5,113,797 A 5/1992 van Daele
5,311,839 A 5/1994 Pollock et al.
5,462,017 A 10/1995 Pollock et al.
5,718,187 A 2/1998 Pollock et al.
5,762,021 A * 6/1998 Horwood ........... A01K 39/0125 119/57.7

(Continued)

*Primary Examiner* — Timothy D Collins
*Assistant Examiner* — Brittany A Lowery
(74) *Attorney, Agent, or Firm* — Patenting Consulting Group; Roberto J Rios

(57) ABSTRACT

An automatic bird feeder with a double telescopic system is disclosed, designed for poultry farms with floor or cage installations. The feeder features a rectangular rounded plate with a sliding upper rim and internal ridges for 360° food distribution. A conical hopper with a lower grate and L-shaped crossbars prevents bird entry and contamination. The feeder includes a first telescopic system, which increases plate height as the feeder is raised, allowing for greater feed storage. A second telescopic system utilizes a restrictor belt that automatically lowers the feed level to minimize waste. The feeder enables easy interior washing through side openings, prevents the "carousel phenomenon" where birds soil the feed, and provides adjustable feeding heights as birds grow. The design optimizes space usage, enhances accessibility, and maintains proper feeding ergonomics, improving efficiency and hygiene in poultry farming.

11 Claims, 7 Drawing Sheets

(56) References Cited

U.S. PATENT DOCUMENTS

| | | | | | |
|---|---|---|---|---|---|
| 5,794,562 | A * | 8/1998 | Hart | A01K 39/0125 119/57.4 |
| 5,927,232 | A | 7/1999 | Pollock | |
| 5,957,083 | A * | 9/1999 | Cheng | A01K 39/0125 119/56.2 |
| 6,655,317 | B1 * | 12/2003 | Steudler, Jr. | A01K 39/0125 119/57.4 |
| 2007/0186863 | A1 * | 8/2007 | Cole | A01K 39/0125 119/61.1 |
| 2016/0021853 | A1 * | 1/2016 | Septien Prieto | A01K 39/0125 119/52.1 |
| 2017/0245475 | A1 * | 8/2017 | Dhumal | A01K 39/0125 |
| 2017/0258053 | A1 * | 9/2017 | Teh | H04B 7/18589 |
| 2019/0014751 | A1 | 1/2019 | Loo et al. | |
| 2021/0352875 | A1 * | 11/2021 | Septien Prieto | A01K 39/00 |

* cited by examiner

AUTOMATIC BIRD FEEDER WITH DOUBLE TELESCOPIC SYSTEM

TECHNICAL FIELD

The present invention relates to a poultry feeder primarily for broiler in automated poultry farms that are located on the floor or in a cage. In particular, the invention refers to an automatic feeder for birds of variable height with a double telescopic system, to feed birds from the first day of age and throughout their growth, where the first telescopic system allows to increase the amount of feed in the feeder, and the second telescopic system allows to lower the level of feed to avoid its waste.

BACKGROUND OF THE INVENTION

As is well known in the prior art, commercial poultry farming is the most important livestock activity worldwide, as it is responsible for the production of poultry for productive purposes. In general, poultry farming can be classified into two types: technified production facilities, dependent on various automated systems, and traditional or non-technical facilities that depend to a large extent on manual equipment that requires manual labor from a person.

Technified facilities are the most widely used worldwide, accounting for 75% of commercial exploitation worldwide, producing more than sixty billion poultry per year to produce meat. The technified production facilities have automation in all their systems that are necessary for intensive production, such as; feeder system, nipple drinking system, feeder suspension systems, drinkers and brooders, ventilation and air cooling systems, heating systems among others. In contrast, traditional or non-technical facilities are rudimentary and conventional facilities, which use manual equipment such as bucket-type feeders and bell-type hanging drinkers, manually ignited heaters, manual curtains, all of them totally dependent on human supervision at all times for their proper operation.

In this sense, as is known in the prior art, the production of birds comprises three to five stages. Poultry production for meat usually ends between the fifth and ninth week of age depending on the specific type of bird the market demands.

Therefore, the most important factor in this industry is poultry feed, which represents 75% of the total production costs, being the most relevant factor to take care of and that any action that is aimed at maximizing the use of feed will result in greater production efficiency, increasing the economic benefit for the poultry producer.

In accordance with the stated above, there are automatic type feeders in the prior art for feeding birds throughout their production growth, which are generally round or oval in shape, although there are also feeders of different shapes and sizes, triangular, hexagonal, square and rectangular, such as those disclosed in documents MX172752B, U.S. Pat. No. 5,462,017, ES2078203T1, which refer to round feeders where a common problem in these conventional feeders is that they occupy a large area within the production room so a lower number of birds per square meter are placed, reducing productivity. In addition, some other feeders have oval corners or ends, causing a great problem for the birds when it comes to feeding as they dispute and fight for the same eating space, so the feed consumption is significantly lower and therefore the production results are unsatisfactory.

Equally, in this type of conventional feeders, there is the problem of allowing birds to enter the feeder and generating the carousel phenomenon, in which the birds that get into the feeder continuously walk inside the plate without leaving and the birds end up defecating the food. soiling and sleeping, which causes the food to be highly contaminated. Also, in order to properly wash the internal parts, it is necessary to individually disassemble the plate and/or its internal parts, which consumes a lot of time and money.

Therefore, the prior art does not have an automatic feeder with a double telescopic system to feed birds from the first day of age and throughout their growth, and which allows to increase the amount of feed in the feeder, and lower the feed level automatically without the need to manage each feeder individually to avoid feed waste.

OBJECTS OF THE INVENTION

It is, therefore, an object of the present invention to provide an automatic bird feeder with a double telescopic system, which can be used both on the floor and in a cage.

Another object of the present invention is to provide an automatic bird feeder with a double telescopic system, which allows the interior of the feeder to be seen and which allows completely washing and disinfection both inside and outside without having to disassemble it.

A further object of the present invention is to provide an automatic bird feeder with a double telescopic system, which prevents birds from entering the feeder and contaminating the feed with their feet or other body part and waste the feed when moving the head.

Another object of the present invention is to provide an automatic feeder for birds with a double telescopic system, which offers different feeding height and which, depending on the size of the birds, is detached from the floor so that it reaches the appropriate height at the level of the chest of the birds.

A further object of the present invention is to provide an automatic feeder for birds with a double telescopic system, which occupies less space within the production facility, thus allowing the use of more feeders (or placing a greater number of birds).

An additional object of the present invention is an automatic feeder for birds with a double telescopic system, which allows for greater accessibility, quantity and availability of food.

A further object of the present invention is to provide an automatic feeder for birds with a double telescopic system, where the peripheral feeding area is equal to or greater than conventional feeders.

Still an additional object of the present invention is to provide an automatic bird feeder with a double telescopic system, where the plate with a pair of internal central ridges and the tab allow filling the plate in 360°.

Yet another object of the present invention is to provide an automatic bird feeder with a double telescopic system, which aligns adult chickens perpendicularly to avoid food waste.

Still another object of the present invention is to provide an automatic bird feeder with a double telescopic system, which allows its use with or without anti-perching wiring depending on the type of installation, whether floor or cage.

BRIEF DESCRIPTION OF THE INVENTION

These and other objects are achieved through an automatic bird feeder with a double telescopic system, which is made up of a substantially rectangular rounded plate with a sliding upper peripheral rim and a pair of internal central ridges for food distribution; a hopper complementary to said plate that comprises; a substantially conical body; a lower grate integrally joined to said body, formed by a peripheral wall with an upper sliding stop and a lower sliding stop, and a plurality of inverted L-shaped crossbars a plurality of side openings to allow interior washing; an upper throat comprising: a front insertion slot; a receiving through hole adjacent said slot; and a top opening comprising a plurality of T-shaped sliding interior side projections; and a second plurality of side openings to allow interior washing; an upper cover that engages said T-shaped sliding interior projections of said upper throat, by means of a pair of T-shaped lateral slots; a sliding tab configured to be inserted into the front slot, which comprises a pair of lateral manipulation fins; and a divided central hole configured to distribute the food 360° within the plate in conjunction with the pair of central ridges; and a food restrictor belt comprising a plurality of lower openings on the periphery thereof, configured to receive the plurality of L-shaped crossbars of the lower grate without interfering with the elevation of the hopper, wherein said belt is configured to lower the level of food on the plate; wherein the first telescopic system is formed by the grate of the hopper and the plate, so that the height of the plate is increased when the feeder is raised, so that the hopper will move upward with respect to the plate and the plate by gravity effect will remain in the same position, increasing its height and allowing the amount of food that can be contained in the plate to increase; and where the second telescopic system is formed by the restrictor belt so that when the hopper is raised, the restrictor belt will automatically move downwards by its own weight, to lower the level of food available inside the plate for the bird avoiding its waste.

DETAILED DESCRIPTION OF THE INVENTION

Figure 1:
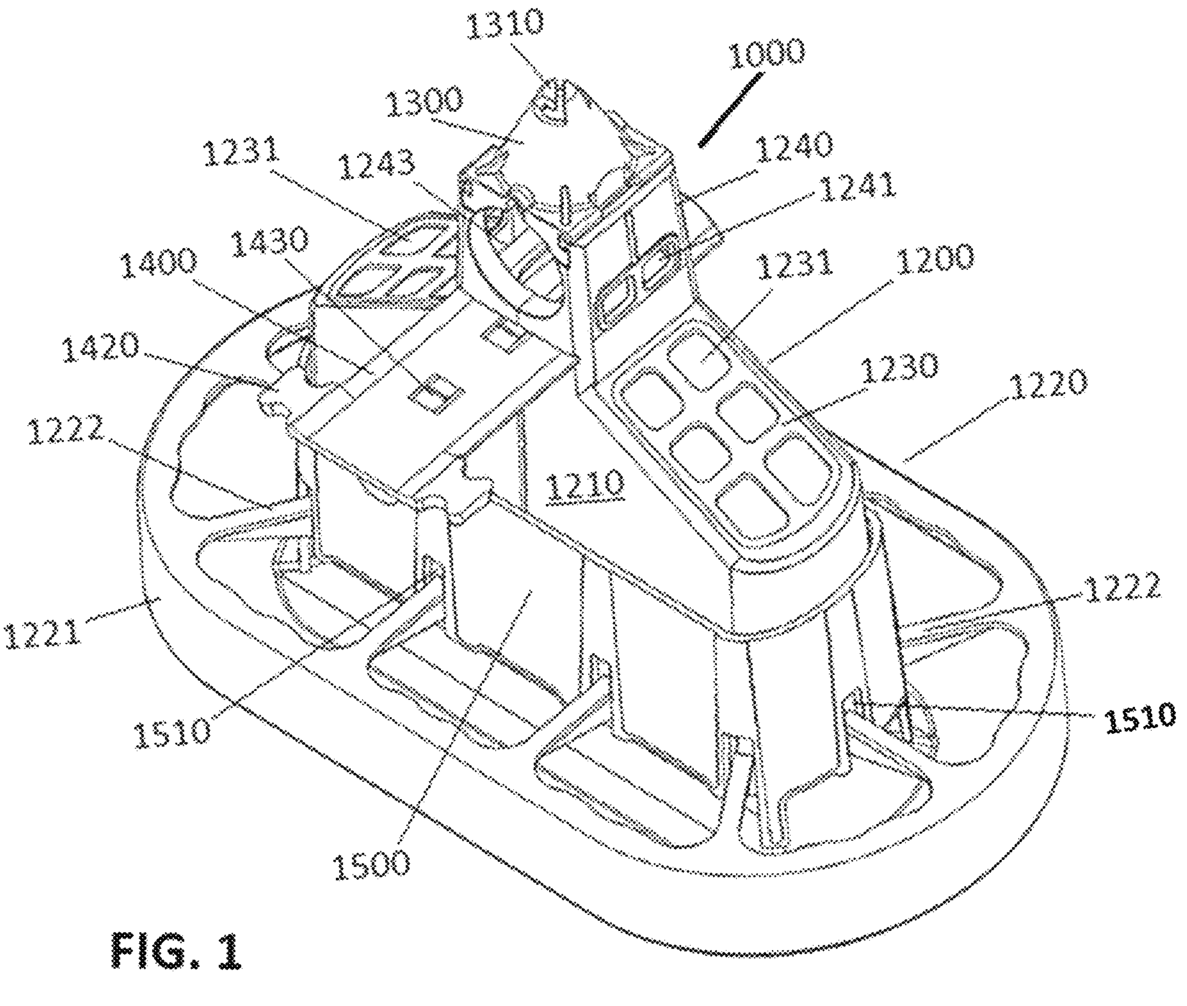
FIG. 1 is a perspective view of the variable height telescopic bird feeder of the present invention.
Figure 2:
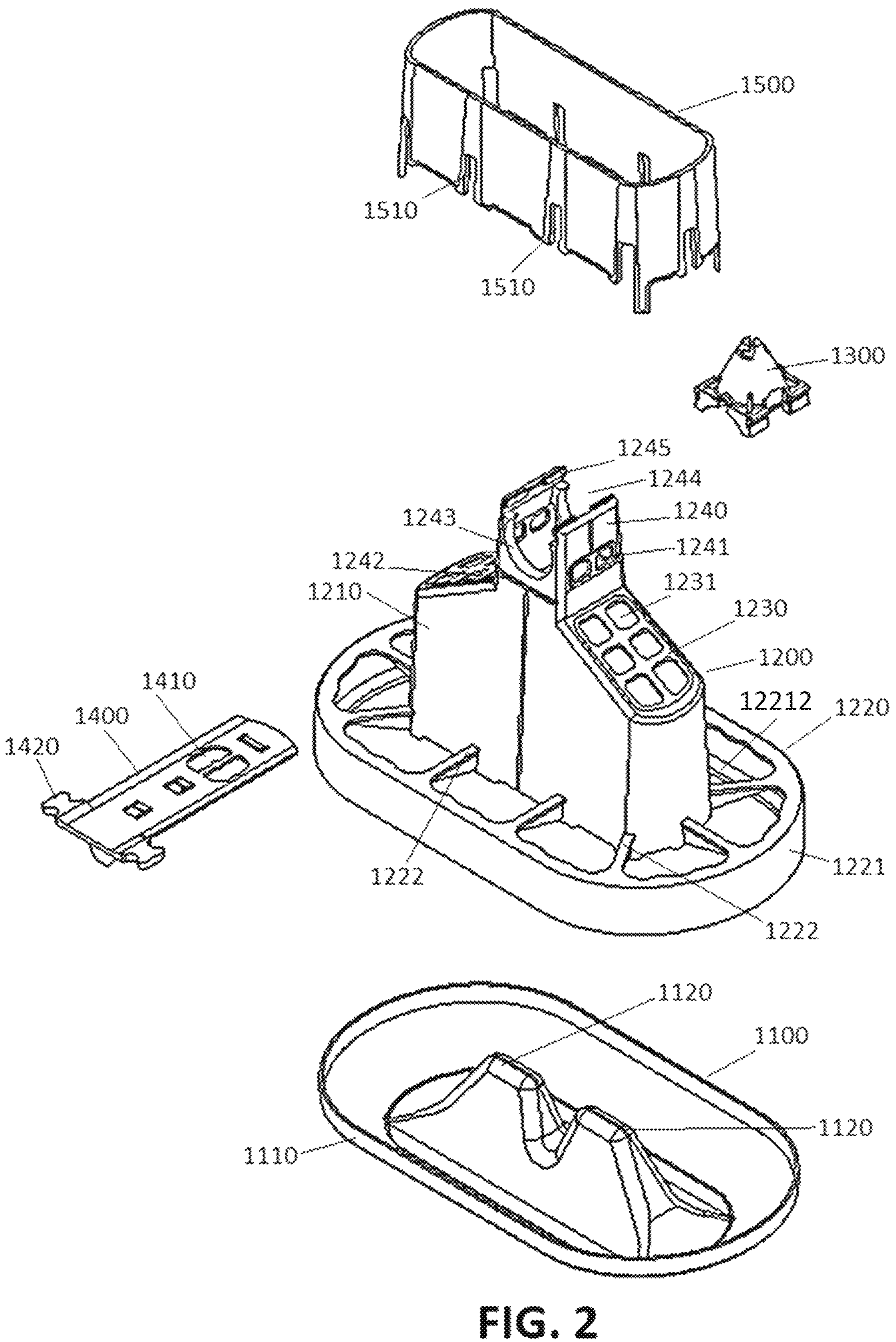
FIG. 2 is an exploded view of the variable height telescopic bird feeder of the present invention.

With reference to FIG. 1, the automatic bird feeder with double telescopic system generally numbered 1000 is shown. Said feeder with double telescopic system 1000 is mainly formed by a food receiving plate 1100; a hopper 1200; a top cover 1300; a sliding tongue 1400 and a food restrictor belt 1500. As shown in FIGS. 1 and 2, said food receiving plate 1100 has a rectangular shape with its corners rounded and a substantially conical peripheral wall, integrally joined to a bottom wall. Said plate 1100 comprises at the upper end of its peripheral wall a sliding peripheral rim 1110 that forms a kind of step that serves as a means of coupling with the hopper 1200 and as a means to increase the height of the feeder. Said plate also includes inside a pair of central longitudinal ridges 1120 which have the function of uniformly distributing the food throughout the plate, which falls on said ridges from the hopper 1200.

Figure 3:
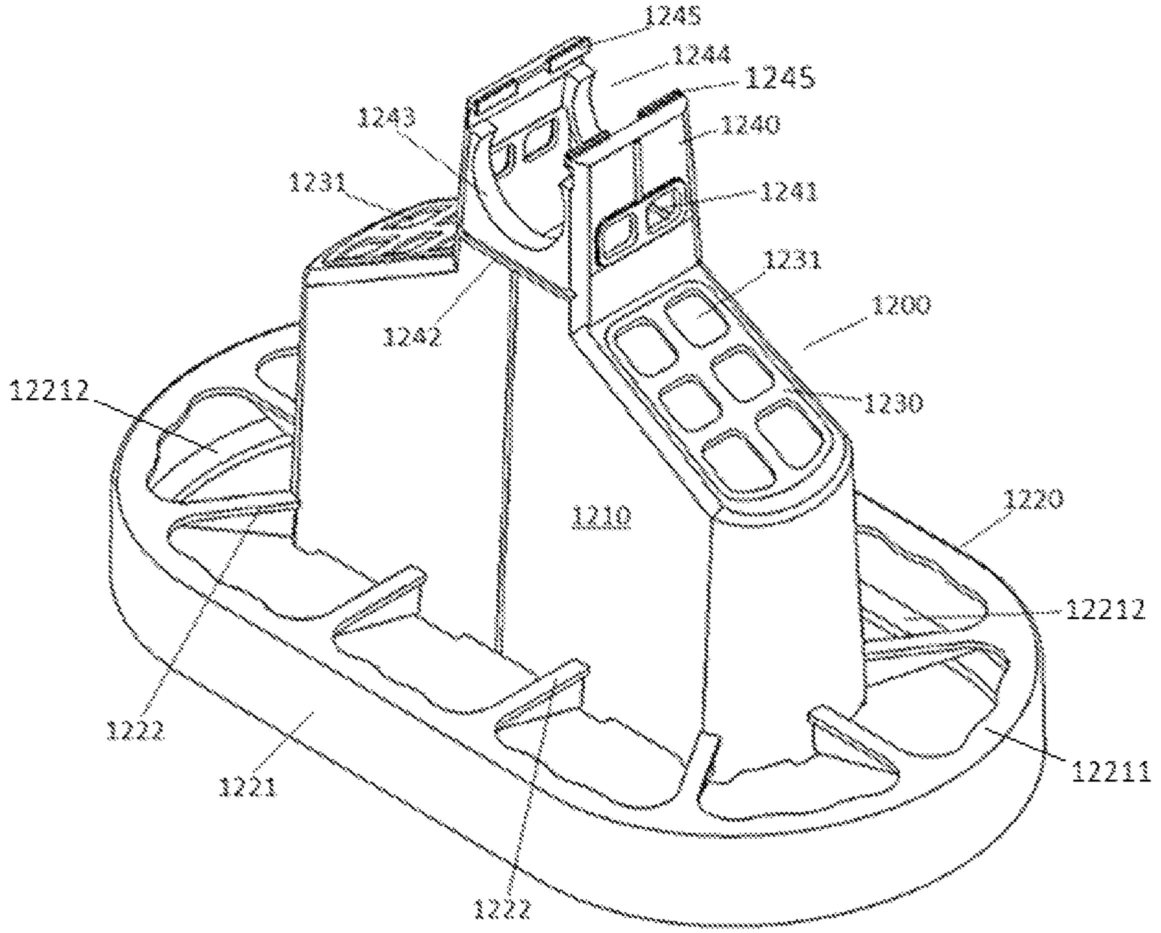
FIG. 3 is a perspective view of the hopper of the variable height telescopic bird feeder of the present invention.

Referring now to FIGS. 1 to 3, the hopper 1200 is shown, which has a complementary shape to said plate 1100, where said hopper 1200 comprises a substantially conical body 1210 with inclined side walls 1230, said body 1210 comprising in its lower part a lower grate 1220 integrally joined thereto, which is formed by a peripheral wall 1221 that has an internal upper sliding stop 12211 and an internal lower sliding stop 12212 which are configured to limit the advancement or sliding of the peripheral sliding rim 1110 of the plate 1100 both up and down, thus forming the first telescopic system, where in an initial position the sliding rim 1110 is in contact with the internal upper sliding stop 12211 and in a final position the sliding rim 1110 is in contact with the internal lower slide stop 12212. Said grate further comprises a plurality of inverted L-shaped crossbars 1222, which extend laterally from the internal upper sliding stop 12211, and by means of which said grate 1220 is united to said body 1210, where said inverted L-shaped crossbars 1222 is distributed equidistantly on the periphery of said body 1210 to provide rigidity to the body 1210. In said first telescopic system, the peripheral wall 1221 allows elevating the hopper 1200 without raising the plate, so that the height of the feeder 1000 can be increased, where the final height of the feeder is limited by the height of the peripheral wall 1221 of the lower grate 1220. Said inclined side walls 1230 comprise a plurality of side openings 1231 that allow seeing the assortment and level of the food, as well as promoting thoroughly washing and disinfection both the exterior and interior. Likewise, these L-shaped crossbars prevent the birds from entering the interior of the plate generating the carousel phenomenon in which the chickens enter and continue walking inside the plate without getting out, so the birds end up defecating the food, soiling it and sleeping, which causes the food to have a high degree of contamination.

Said body 1210 additionally comprises an upper throat 1240 of square cross section, which extends from the inclined side walls 1230, where said upper throat 1240 comprises: a plurality of lateral openings 1241 on both sides thereof to allow internal washing; a front insertion slot 1242 configured to slidably receive said sliding tab 1400; a receiving circular passthrough hole 1243 located adjacent to said slot 1242 and extending from the front face of the throat 1240 to the rear face thereof, where said passthrough hole 1243 is cut in its upper part by an upper opening 1244, which comprises side walls with a plurality of T-shaped sliding interior side projections 1245.

Said hopper 1200 also comprises an upper cover 1300 which in a first embodiment comprises a conical upper part with a hook 1310 at its upper end, which allows placing a bird anti-perching cable (not shown) to place the feeder on the floor; a plurality of T-shaped side slots 1320 configured to slideably receive the plurality of T-shaped sliding interior side projections 1245; a plurality of reinforcing ribs 1330 to provide rigidity; and a longitudinal slot or channel 1340 configured to couple the feeder to metal feed distribution tubes with a flat seam or rim.

In a second embodiment, the cover 1300A comprises a flat upper part 1310A, which allows the feeder 1000 to be placed in a cage without interference; a plurality of T-shaped side slots 1320A configured to slideably receive the plurality of T-shaped sliding interior side projections 1245; a plurality of reinforcing ribs 1330A to provide additional rigidity to the cover; and a longitudinal slot or channel 1340A configured to couple the feeder to metal feed distribution tubes with a flat seam or rim. Said covers 1300, 1300A comprise in their lower part a curved or semicircular face, which comprises said longitudinal slot or channel 1340, 1340A, and which is configured to complement said passthrough hole 1243 and form the circular passthrough hole 1243 when the cover 1300 is placed in the opening 1244.

Said passthrough hole 1243 and said covers 1300, 1300A are configured to couple the feeder to metal food distribution tubes with a seam or rim through said longitudinal slot or channel 1340 in a cross manner, so that the space between feeders is greater while occupying a smaller area due to its rectangular-rounded shape.

Figure 4:
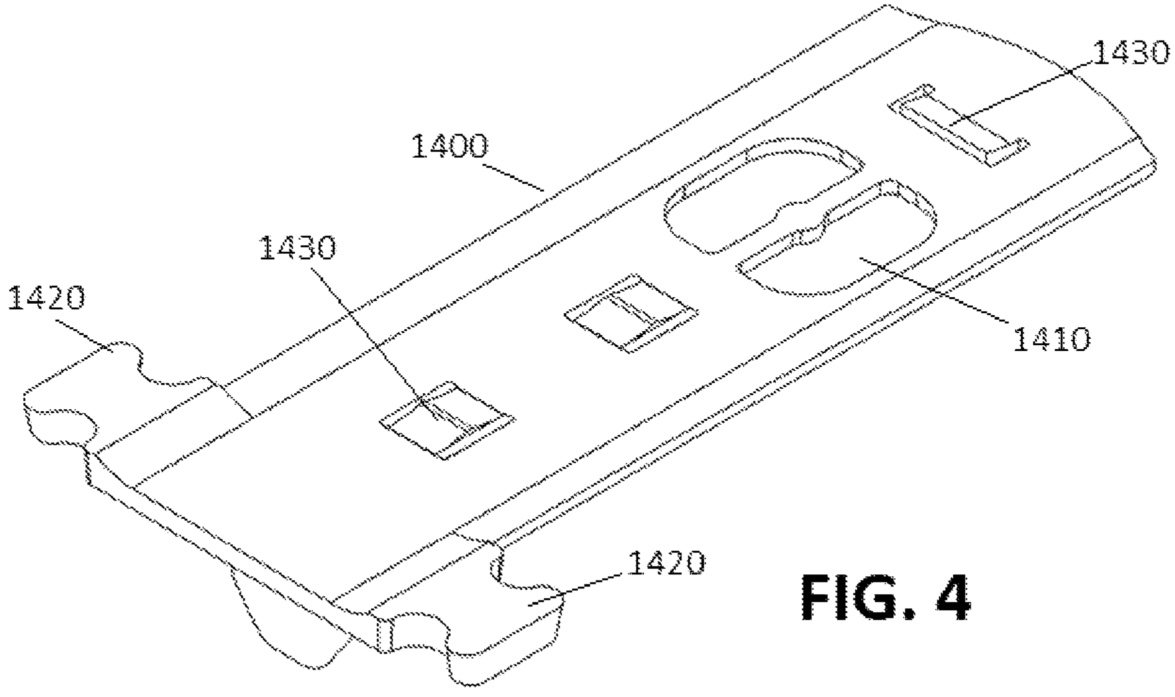
FIG. 4 is a perspective view of the sliding tab of the variable height telescopic bird feeder of the present invention.
Figure 5A:
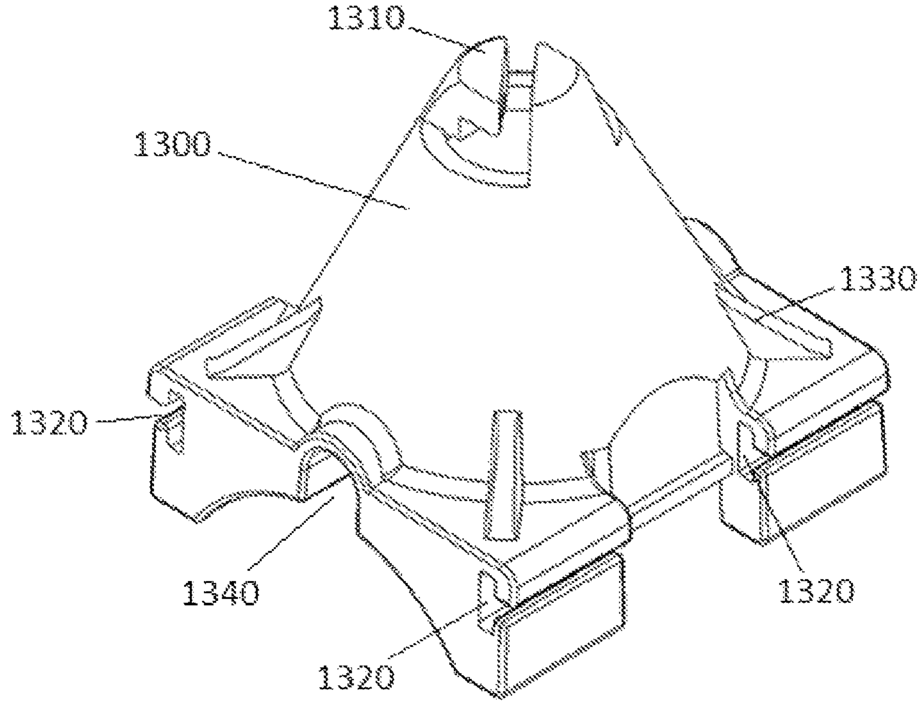
FIGS. 5A and 5B are perspective views of the two embodiments of the upper cover of the telescopic bird feeder of variable height of the present invention.
Figure 5B:
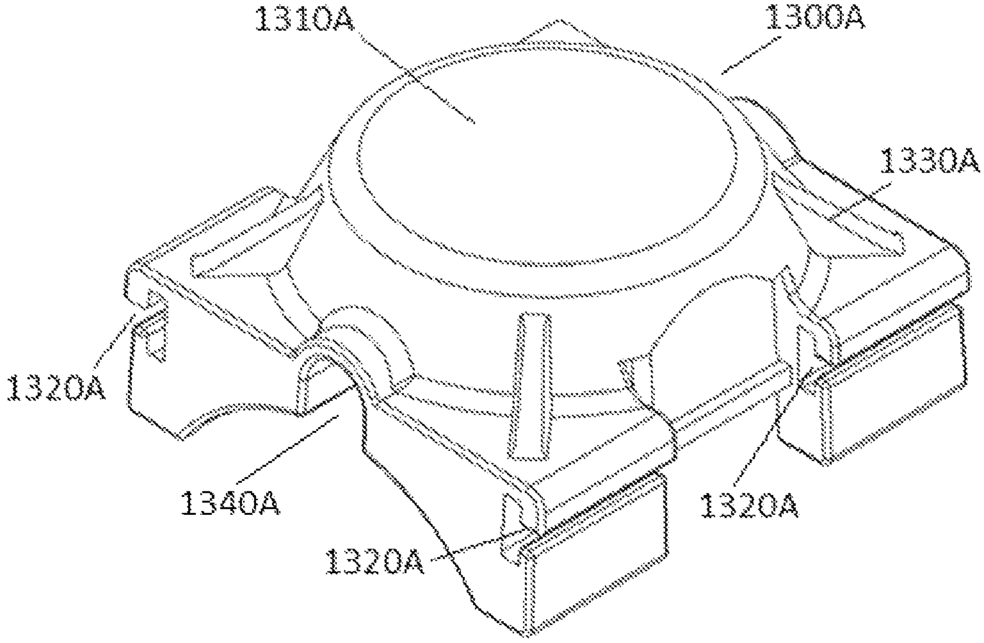

As shown in FIG. 4, the sliding tab 1400 comprises a divided central hole 1410 configured to direct or distribute the food on the plate 3600 in conjunction with the pair of central ridges 1120; a pair of lateral manipulation fins 1420, which allow the tab 1400 to be pulled or pushed to allow or prevent the dispensing of feed coming from the feed distribution tube into the interior of the feeder; and a plurality of stops or locks 1430, which are configured to keep said tab in the selected position so that it does not move or displace inadvertently or accidentally.

Figure 7A:
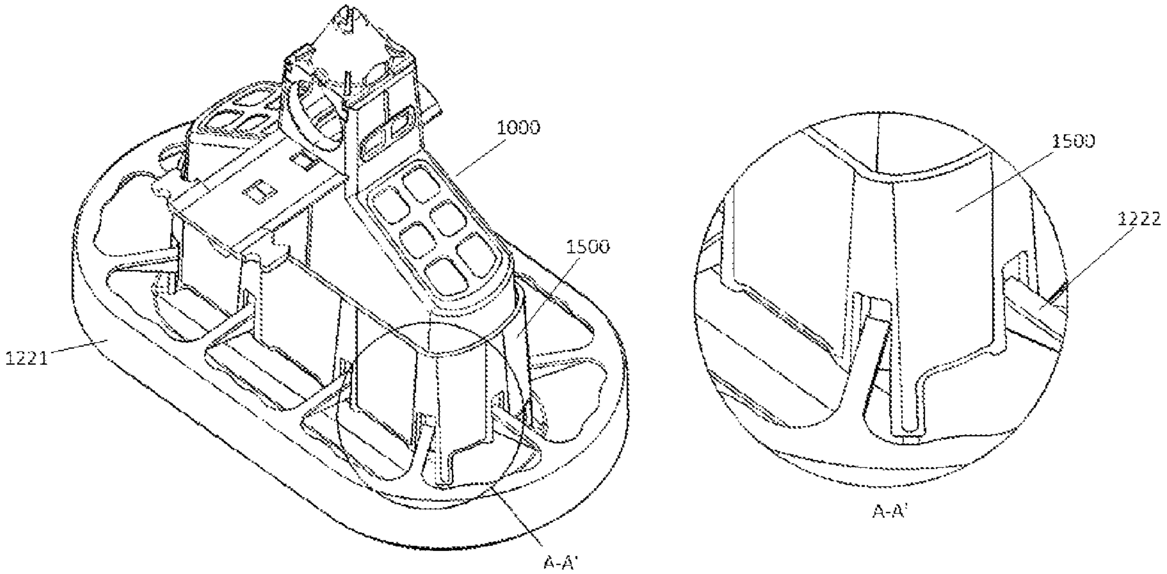
FIGS. 7A and 7B are views showing in detail the movement of the restrictor belt to control the feed level.
Figure 7B:
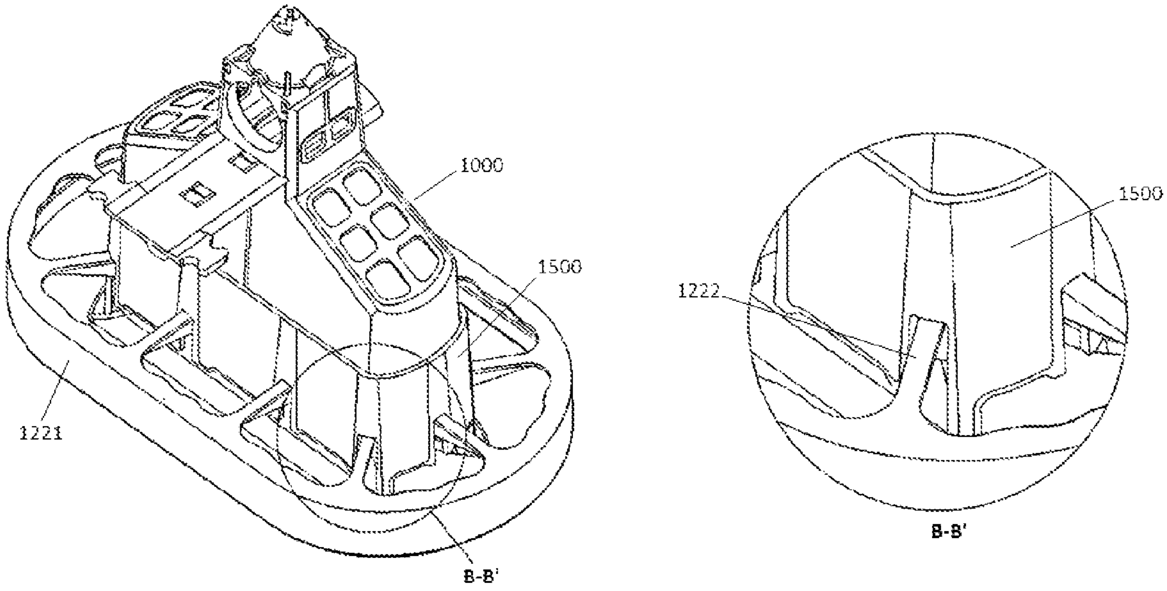

Referring again to FIGS. 1 and 2, it can be seen that the food restrictor belt 1500 comprises a plurality of lower openings 1510 located on its periphery, and which are configured to receive the plurality of L-shaped crossbars, of the lower grate 1220 without interfering with the lifting of the hopper. As shown in FIGS. 7A and 7B, said restrictor belt 1500 is configured to slideably couple itself to the lower outer part of said conical body 1210, and thus form the second telescopic system, which is configured to lower the level of food that is available inside the dish for the birds, so that it is not wasted when they pitch, where said restrictor belt slides down by its own weight when the hopper is raised to lower the level of food inside the plate and when the plate is in its initial position (first days of life of the birds) said restrictor belt does not interfere with the level of food in the plate and at this point said belt could be completely removed. In this way, the restrictor belt comes into action to lower the feed level when the feeder begins to rise and the height of the plate increases, as well as the amount of feed.

Figure 6A:
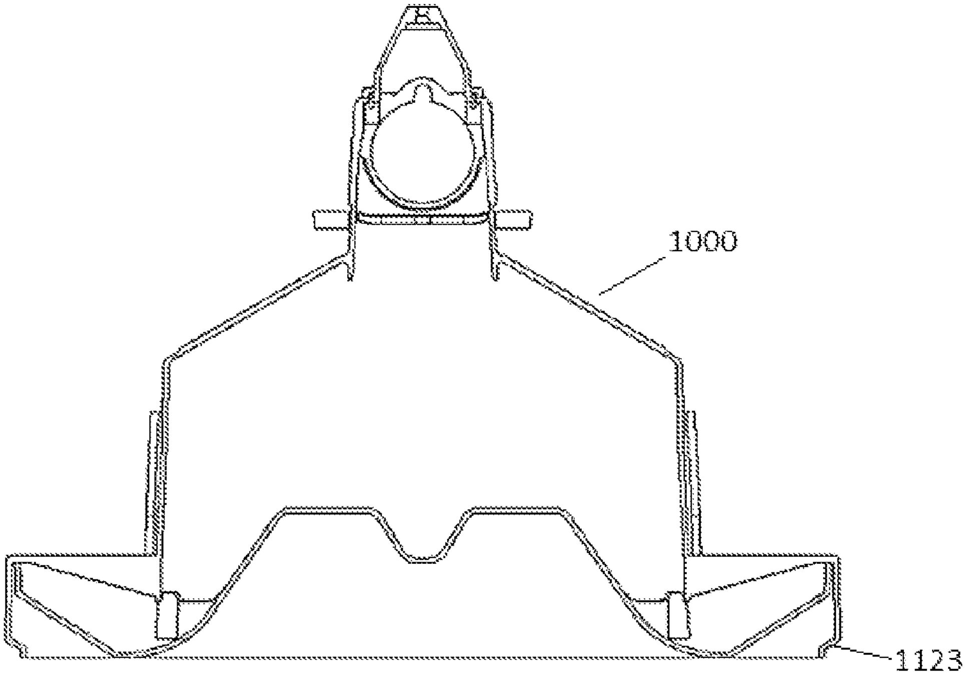
FIGS. 6A and 6B are cross-sectional views of the variable height telescopic bird feeder of the present invention with the hopper positioned at different heights.
Figure 6B:
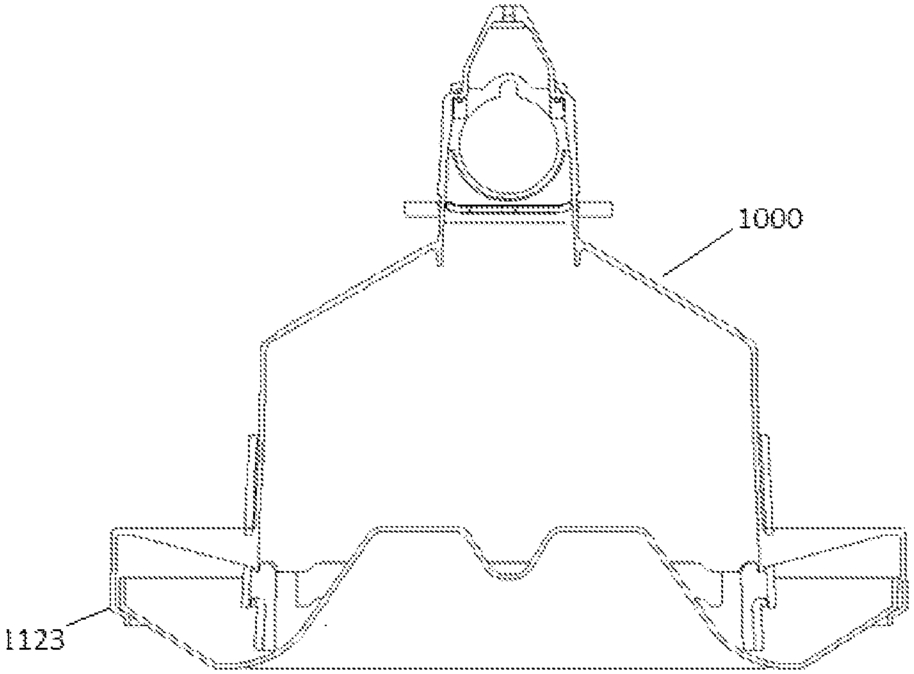

As shown in FIGS. 6A and 6B, the feeder with double telescopic system 1000 of the present invention allows different feeding heights as well as different amounts of food inside the plate and depending on the height of the birds, the feeder 1000 is raised, so that the first telescopic system comes into action allowing the hopper 1200 to separate from the plate 1100 and the restrictor belt 1500 to move downwards, and when the birds have a considerable height (more than 10 days) both the hopper 1200 and the plate 1100 detach from the ground so that the appropriate height is always at the level of the birds' chest, and the restrictor belt 1500 remains in its final position completely down. Likewise, the 1000 telescopic feeder is designed so that young birds eat facing the feeder and when they are adults the birds eat from the side of the feeder, so the arrangement of the birds is perpendicular which prevents the birds from touching their tails when eating.

In accordance with the present invention, as can be seen, the feeder with double telescopic system 1000 is a feeder with two collapsible or adjustable systems that do not require the intervention of any operator, since said collapsible or adjustable systems operate automatically when the feeder is raised. In this sense, in an initial position when the feeder is on the floor and in which the plate 1100 and the hopper 1200 are collapsed, as shown in FIG. 6A, the plate contains an initial amount of food, likewise, when the restrictor belt is also in its initial position or completely up as shown in FIG. 7A, the level of food in the plate 1100 does not change; now, when the feeder 1000 is raised as shown in FIG. 6B, the hopper will move upward with respect to the plate, and the plate, due to the effect of gravity, will remain in the same position, increasing its height and allowing the amount of food that can be contained in the plate 1100 to increase; likewise, when the hopper is raised the restrictor belt 1500 will move downward under its own weight as shown in FIG. 7B, to lower the level of food available to the birds inside the plate, where the more the hopper 1200 is raised the more the restrictor belt 1500 moves downward until reaching the final position shown in FIG. 7B. Finally, as the birds grow, the feeder 1000 continues to rise until it is completely off the ground, maintaining the position of the plate 1100, hopper 1200 and belt 1500 shown in FIG. 7B, so that said plate 1100 is always at the height from the birds' chest.

This function is very important, since unlike the telescopic feeders of the prior art where the restrictor mechanism of said feeders must be manipulated and deployed manually by an operator, in contrast, the two telescopic systems of the automatic feeder of the present invention operate without the intervention of an operator, so the plate 1100 can be kept full, but at a controlled level and this is achieved by the restrictor belt 1500.

In accordance with the previously described, it will be evident to a person skilled in the art that the automatic bird feeder with double telescopic system described above is presented for illustrative purposes only, since a person skilled in the art can make numerous variations to it, as long as is designed in accordance with the principles of the present invention. As a consequence of the above, the present invention includes all the embodiments that a person skilled in the art can propose based on the concepts contained in this description, in accordance with the following claims.

The invention claimed is:

1. An automatic bird feeder with double telescopic system, characterized in that it comprises:

a rectangular plate having rounded corners, with a sliding upper peripheral rim and a pair of feed distribution internal central ridges;

a hopper complementary to said plate that comprises; a substantially conical body; a lower grate integrally joined to said body, formed by a peripheral wall with an upper sliding stop and a lower sliding stop, and a plurality of inverted L-shaped crossbars; a plurality of side openings to allow interior washing; an upper throat comprising: a front insertion slot; a receiving passthrough hole adjacent to said slot; and a top opening comprising a plurality of T-shaped sliding interior side projections; and a second plurality of side openings to allow interior washing;

an upper cover that couples to said T-shaped sliding interior projections of said upper throat, through a pair of T-shaped lateral slots;

a sliding tab configured to be inserted into the front slot, which comprises a pair of lateral manipulation fins; and a divided central hole configured to distribute food 360° within the plate in conjunction with the pair of central ridges; and a food restrictor belt comprising a plurality of lower openings on the periphery thereof, configured to receive the plurality of L-shaped crossbars of the lower grate without interfering with the rising of the hopper;

wherein a first telescopic system is made up of the grate of the hopper and the plate, so that the height of the plate is increased when the feeder is raised, so that the hopper will move upward with respect to the plate and the plate will remain in the same position by the effect of gravity, increasing its height and allowing an amount of food that can be contained in the plate to increase; and wherein a second telescopic system is formed by the restrictor belt so that when the hopper is raised, the restrictor belt will automatically move downwards by its own weight, to lower the level of food available for the bird inside the plate and avoid wasting the food.

2. The automatic bird feeder with the double telescopic system in accordance with claim 1, further characterized in that said L-shaped crossbars prevent the birds from entering an interior of the plate and generating a carousel phenomenon in which chickens enter and contaminate the food.

3. The automatic bird feeder with the double telescopic system according to claim 1, further characterized in that the upper cover comprises a conical upper part with a hook at its upper end, which allows for the placement of an anti-perching cable.

4. The automatic bird feeder with the double telescopic system according to claim 1, further characterized in that the upper cover comprises a flat top, which allows the feeder to be placed in a cage without interference.

5. The automatic bird feeder with the double telescopic system according to claim 1, further characterized in that said passthrough hole is cut in its upper part by an upper opening.

6. The automatic bird feeder with the double telescopic system according to claim 5, further characterized in that the upper cover comprises in its lower part a curved or semicircular face, which is configured to complement said cut passthrough hole when the upper cover is placed in the upper opening.

7. The automatic bird feeder with the double telescopic system according to claim 6, further characterized in that said curved or semicircular face comprises a longitudinal slot or channel for coupling the feeder to food distribution metal tubes with a seam or rim.

8. The automatic bird feeder with the double telescopic system according to claim 1, further characterized in that the sliding tab additionally comprises a plurality of stops or locks, which are configured to maintain said tab in a selected position so that it does not move or displace inadvertently or accidentally.

9. The automatic bird feeder with the double telescopic system according to claim 2, further characterized in that said passthrough hole is cut in its upper part by an upper opening.

10. The automatic bird feeder with the double telescopic system according to claim 3, further characterized in that said passthrough hole is cut in its upper part by an upper opening.

11. The automatic bird feeder with the double telescopic system according to claim 4, further characterized in that said passthrough hole is cut in its upper part by an upper opening.

* * * * *